(12) United States Patent
Kumar et al.

(10) Patent No.: US 11,032,248 B2
(45) Date of Patent: Jun. 8, 2021

(54) GUEST THIN AGENT ASSISTED HOST NETWORK ENCRYPTION

(71) Applicant: NICIRA, INC., Palo Alto, CA (US)

(72) Inventors: Vasantha Kumar, Pune (IN); Leena Soman, Pune (IN); Hrishikesh Ghatnekar, Pune (IN)

(73) Assignee: NICIRA, INC., Palo Alto, CA (US)

( * ) Notice: Subject to any disclaimer, the term of this patent is extended or adjusted under 35 U.S.C. 154(b) by 314 days.

(21) Appl. No.: 15/618,129

(22) Filed: Jun. 9, 2017

(65) Prior Publication Data

US 2018/0262468 A1    Sep. 13, 2018

(30) Foreign Application Priority Data

Mar. 7, 2017    (IN) .............................. 201741007940

(51) Int. Cl.
*H04L 29/06* (2006.01)
*G06F 9/455* (2018.01)
*H04L 29/08* (2006.01)

(52) U.S. Cl.
CPC ...... *H04L 63/0281* (2013.01); *G06F 9/45558* (2013.01); *H04L 63/0485* (2013.01); *H04L 67/10* (2013.01); *H04L 67/42* (2013.01); *H04L 69/161* (2013.01); *G06F 2009/45579* (2013.01); *G06F 2009/45587* (2013.01); *G06F 2009/45595* (2013.01); *H04L 63/164* (2013.01)

(58) Field of Classification Search
CPC ............. H04L 63/0281; H04L 63/0485; H04L 63/164; H04L 67/10; H04L 67/42; H04L 67/161; G06F 9/45558; G06F 2009/45579; G06F 2009/45587; G06F 2009/45595

See application file for complete search history.

(56) References Cited

U.S. PATENT DOCUMENTS

| 9,444,841 | B2 * | 9/2016 | Feroz .................... H04L 63/166 |
| 2013/0034109 | A1 * | 2/2013 | Cardona ............. H04L 12/4633 370/419 |
| 2017/0126638 | A1 * | 5/2017 | Ye ........................ H04L 63/0471 |
| 2018/0099968 | A1 | 4/2018 | Zhang et al. |
| 2018/0217858 | A1 * | 8/2018 | Moolenaar .......... G06F 9/45558 |

* cited by examiner

*Primary Examiner* — Joseph P Hirl
*Assistant Examiner* — Chi D Nguy
(74) *Attorney, Agent, or Firm* — Su IP Consulting (57) ABSTRACT

A method to selectively encrypting packets includes filtering calls, at a virtual machine on a host, to connect sockets to server applications. When a call by a client application to connect a socket to a server application is detected, the method includes determining if the socket between the client and the server applications is to be encrypted based on identities of the client application, a user logged in on the virtual machine, or the client application and the user logged in on the virtual machine. The method includes filtering outbound packets in a protocol stack of the virtual machine. When the socket is to be encrypted and an outbound packet for the socket is detected, the method includes tagging the outbound packet for encryption by a hypervisor on the host and sending the outbound packet to a virtual network interface card (vNIC) emulated by the hypervisor.

21 Claims, 6 Drawing Sheets

GUEST THIN AGENT ASSISTED HOST NETWORK ENCRYPTION

RELATED APPLICATIONS

Benefit is claimed under 35 U.S.C. 119(a)-(d) to Foreign Application Serial No. 201741007940 filed in India entitled "GUEST THIN AGENT ASSISTED HOST NETWORK ENCRYPTION", on Mar. 7, 2017, by NICIRA, INC., which is herein incorporated in its entirety by reference for all purposes.

BACKGROUND

Unless otherwise indicated herein, the approaches described in this section are not admitted to be prior art by inclusion in this section.

Virtualization is the process of creating a software-based (or virtual) representation of something, including virtual computer hardware platforms, operating systems, storage devices, and computer network resources. Virtualization can apply to applications, servers, storage, and networks and is an effective way to reduce IT expenses while boosting efficiency and agility for all size businesses. Virtualization is often used in cloud computing, helping to leverage a pool of shared, elastic resources on the Internet.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In cloud environments, a misconfiguration of network setting can expose network data of one tenant to another. To secure the network data between a tenant's virtual machines (VMs), data can be encrypted using standard network layer protocol like Internet Protocol Security (IPSec). IPSec protects the network data from cloud service provider and other tenants in the cloud. IPSec agents installed in different VMs can form an IPSec tunnel between them. However, this can be a tedious task as the tenant has to configure the agents in the individual VMs.

To overcome this problem, there are host based encryption solutions that encrypt the VM network packets with a unique key per tenant. However, host based encryption requires an IPSec stack to be implemented in the host in addition to maintaining the keys. There can also be IPSec fragmentation related issues as the encapsulation is likely to increase the size of the packet higher than the maximum transmission unit (MTU) supported by the physical networks.

Furthermore, context information such as which user or process is generating the traffic is unavailable to the host. As a result, the host encrypts all traffic generated by the VM including non-confidential business data and already encrypted data, such as secured sockets layer (SSL) data. This significantly increases central processing unit (CPU) usage and reduces the data payload per Internet Protocol (IP) datagram.

Newer operating systems (OS) provide the functionality of IPSec offloading to a network interface card (NIC). The driver of such a NIC provides a special interface to the OS to offload the encryption part of IPSec processing to the NIC. The transmission control protocol/Internet Protocol (TCP/IP) stack in the OS sets the security association (SA), which specifies a key and an encryption algorithm, for the traffic and then passes any packet that needs to be encrypted to the NIC in a special buffer. The NIC encrypts the traffic using the SA set by the TCP/IP stack. Most IPSec application vendors use this capability to offload encryption/decryption of packets to the NIC to reduce CPU cycles. The driver for a virtual NIC (vNIC) in a VM, such as VMXnet vNIC driver, can be extended to emulate this IPSec offload functionality.

In examples of the present disclosure, instead of performing encryption entirely in a VM or a host, the VM selects the traffic to be encrypted and the host performs encryption on such traffic. In some examples of the present disclosure, a thin agent in the VM selects the traffic that needs to be encrypted and sets a dummy manual SA for the traffic on the TCP/IP stack in the guest OS (hereafter "guest TCP/IP stack"). The guest TCP/IP stack provides the encapsulating security payload (ESP) header with the unencrypted payload to the vNIC driver with IPSec offload functionality. The vNIC driver's host component performs encryption of the payload.

A SA manager may centrally provisional SAs, including encryption keys, to the hosts. This way each host does not need to have an IPSec stack to perform Internet key exchange (IKE) to set SAs between the peers. Each host maintains its own list of SAs per tenant or per VM, and performs encryption/decryption based on this information.

This approach provides several advantages. First, the host does not need to modify packets as the guest TCP/IP stack forms the IPSec packets so the vNIC can have the same MTU as the physical NIC on the host performing the IPSec encryption. This frees the host from performing maximum segment size (MSS) clamping on the TCP traffic, which is often used to avoid fragmentation of TCP traffic over an IPSec tunnel.

Second, performance improves as the guest TCP/IP stack passes packets to be encrypted in a special buffer. This saves the host from performing IP address matching to find the packets to be encrypted.

Third, the host maintains and manages the keys to encrypt and decrypt the traffic. The VM does not have access to the keys but is aware of the IPSec tunnel established between VMs.

Fourth, since the VM selects the traffic to be encrypted, it can provide granular control of the encryption traffic. The VM may encrypt based on user or process generating the traffic. For example, the VM may skip the Skype traffic for encryption while performing encryption on Internet Explorer (IE) traffic.

Fifth, the vNIC may emulate both TCP segment offload (TSO) and IPSec offload. With TCP segment offload, the guest TCP/IP stack can pass large TCP segments to the vNIC. This would free the guest TCP/IP stack from IPSec as well as TCP segmentation tasks.

Figure 1:
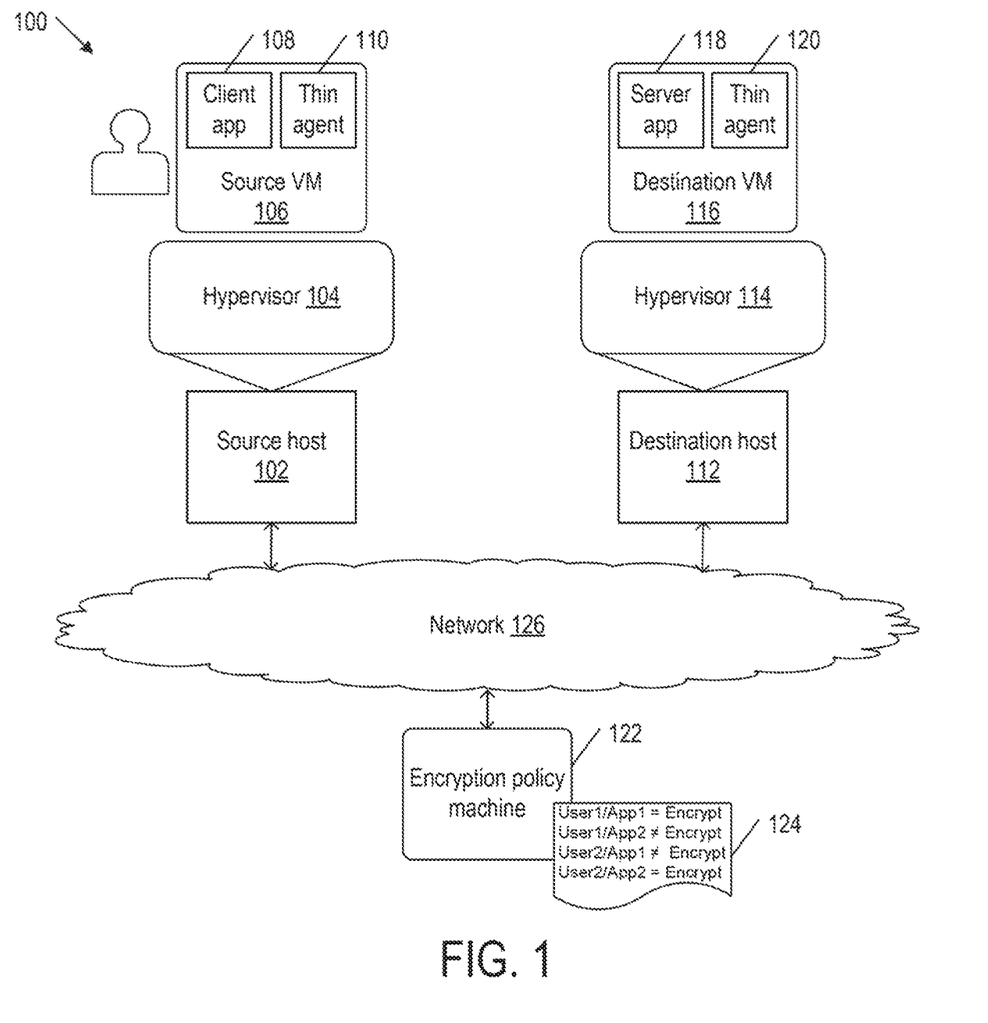
FIG. 1 is a block diagram illustrating a VM system in examples of the present disclosure.

FIG. 1 is a block diagram illustrating a VM system 100 in examples of the present disclosure. VM system 100 includes a source host 102 running a hypervisor 104, which is running a source VM 106. Source VM 106 includes a client application 108 and a thin agent 110.

VM system 100 includes a destination host 112 running a hypervisor 114, which is running a destination VM 116. Destination VM 116 includes a server application 118 and a thin agent 120.

VM system 100 includes an encryption policy machine 122, which has a table 124 of encryption policies based on applications, users, or both. Encryption policy machine 122 may be a standalone component or part of a virtualization manager that centrally provisions and manages virtual and physical objects in VM system 100. Encryption policy machine 122 may be a physical computer or a VM.

Source host 102, destination host 112, and encryption policy machine 122 communicate via a network 126. For example, client application 108 sends a request to server application 118, and server application 118 returns a response to client application 108.

As used herein, the term "hypervisor" may refer generally to a software layer or component that supports the execution of multiple virtualized computing instances (e.g., virtual machines), including system-level software that supports namespace containers such as Docker, etc.

Figure 2:
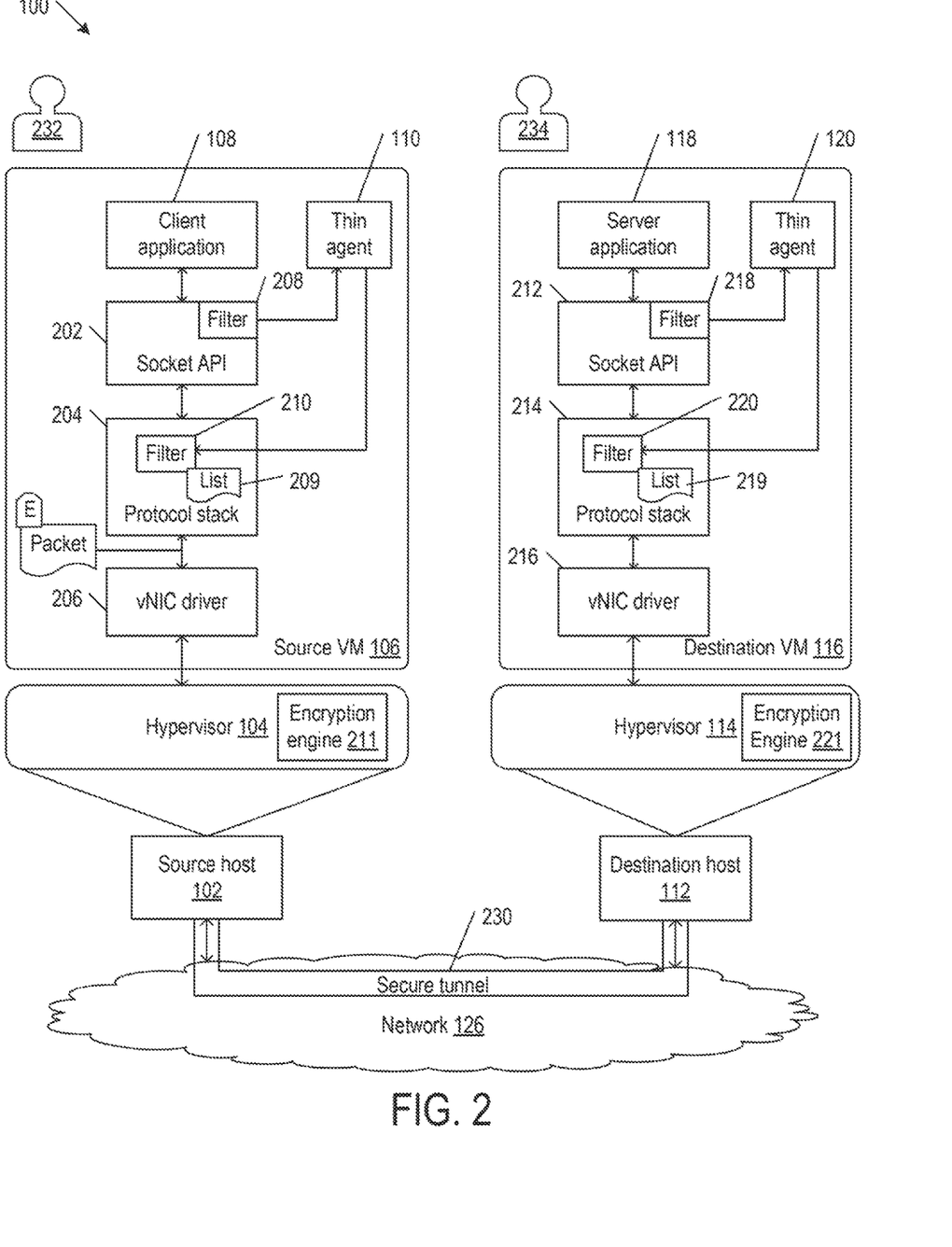
FIG. 2 is a block diagram illustrating a more detailed view of hypervisors, a source virtual machine (VM), and a destination VM of FIG. 1 in some examples of the present disclosure.

FIG. 2 is a block diagram illustrating a more detailed view of hypervisor 104, source VM 106, hypervisor 114, and destination VM 116 in some examples of the present disclosure.

Source VM 106 includes a guest OS having a socket application programming interface (API) 202, a protocol stack 204, a vNIC driver 206, a socket filter 208, a list 209 of sockets to be encrypted, and a protocol stack filter 210.

Socket API 202 receives calls from client applications to create, connect, and send/receive application data through sockets. Socket filter 208 detects calls to socket API 202 to connect sockets to server applications. When socket filter 208 detects such a call, it returns the identities of a client application making the call and a user logged onto source VM 106 to thin agent 110.

Thin agent 110 determines if the socket between the client application and the server application is to be encrypted. Thin agent 110 makes this determination by querying encryption policy machine 122 for an encryption policy for the socket from table 124 based on the identities of the application, the user, or both. Alternatively, encryption policy machine 122 pushes encryption policies as they become available to thin agent 110, which determines the encryption policy for the socket from its local copy of table 124 based on the identities of the application, the user, or both. When the encryption policy calls for a socket to be encrypted, thin agent 110 adds the socket's protocol, source address, source port, destination port, and destination address as a 5-tuple to list 209 of sockets to be encrypted.

In protocol stack 204, protocol stack filter 210 detects outbound packets for sockets to be encrypted. Protocol stack filter 210 makes this detection by comparing each outbound packet's 5-tuple against those for sockets to be encrypted in list 209. When protocol stack filter 210 detects such outbound packets, it tags them for encryption by hypervisor 104 and passes them via vNIC driver 206 to hypervisor 104.

Hypervisor 104 includes an encryption engine 211, which is used to establish a secure tunnel 230 between hypervisor 104 on source host 102 and hypervisor 114 on destination host 112. Hypervisor 104 receives the outbound packets to be encrypted (identified by their tags) from source VM 106, encrypts the outbound packets, and sends the encrypted outbound packets over tunnel 230 to hypervisor 114 on destination host 112.

Hypervisor 114 includes an encryption engine 221, which is used to establish secure tunnel 230 between hypervisor 114 on destination host 112 and hypervisor 104 on source host 102. From secure tunnel 230, hypervisor 114 receives encrypted outbound packets from hypervisor 104 and decrypts them to inbound packets.

Similar to source VM 106, destination VM 116 includes a guest OS having a socket API 212, a protocol stack 214, a vNIC driver 216, a socket filter 218, a list 219 of sockets to be encrypted, and a protocol stack filter 220.

Hypervisor 114 sends the inbound packets from hypervisor 104 via vNIC driver 216 to protocol stack 214. Protocol stack 214 assembles application data from the inbound packets and sends them via socket API 212 to their server applications.

Socket API 212 receives calls from server applications to create, bind, listen, accept, and send/receive data through sockets. Socket filter 218 detects calls to socket API 212 to accept connection requests at sockets from client applications. When socket filter 210 detects such a call, it returns the identities of a server application making the call and a user logged onto destination VM 116 to thin agent 120.

Thin agent 120 determines if the socket between the server application and the client application is to be encrypted in the same manner as thin agent 110. When the encryption policy calls for a socket to be encrypted, thin agent 120 adds the socket's 5-tuple to list 219 of sockets to be encrypted.

In protocol stack 214, protocol stack filter 220 detects outbound packets for sockets to be encrypted. Protocol stack filter 220 makes this detection by comparing each outbound packet's 5-tuple against those for sockets to be encrypted in list 219. When protocol stack filter 220 detects such outbound packets, it tags them for encryption by hypervisor 114 and passes them via vNIC driver 216 to hypervisor 114.

Encryption engine 221 receives the outbound packets to be encrypted (identified by their tags) from destination VM 116, encrypts the outbound packets, and sends the encrypted outbound packets over tunnel 230 to hypervisor 104 on source host 102.

Figure 3:
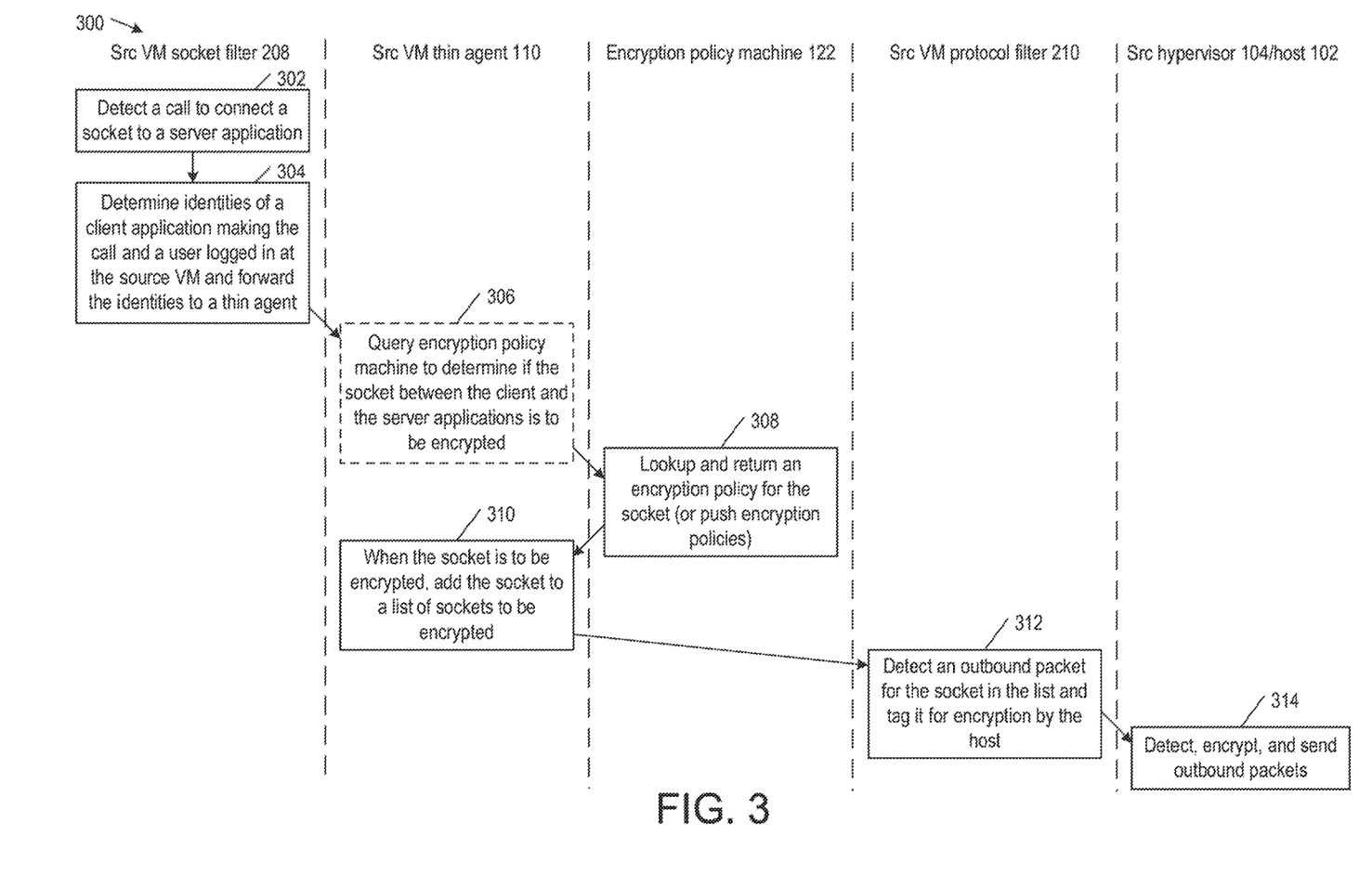
FIG. 3 is a block diagram illustrating a swim lane flowchart of a method for a client application in the source VM to send encrypted application data to a server application in the destination VM of FIG. 2 in some examples of the present disclosure.

FIG. 3 is a block diagram illustrating a swim lane flowchart of a method 300 for client application 108 in source VM 106 on hypervisor 104 to send encrypted application data to server application 118 in destination VM 116 on hypervisor 114 in some examples of the present disclosure.

Method 300 and any method described herein, may be implemented as instructions encoded on a computer-readable medium, that is to be executed by processors in computers of VM system 100. Method 300, and any method described herein, may include one or more operations, functions, or actions illustrated by one or more blocks. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation.

Method 300 may begin in block 302. In block 302, socket filter 208 (FIG. 2) detects a call by client application 108 (FIG. 2) to socket API 202 (FIG. 2) to connect a socket to the address of server application 118 (FIG. 2). Block 302 may be followed by block 304.

In block 304, socket filter 208 determines the identities of client application 108 and a user 232 (FIG. 2) logged in on source VM 106 and returns them to thin agent 110 (FIG. 2). Block 304 may be followed by optional block 306.

In optional block 306, thin agent 110 queries encryption policy machine 122 (FIG. 1) with the identities of client application 108, user 232, or both to determine if a socket between client application 108 and server application 118 is to be encrypted in some examples of the present disclosure. Optional block 306 may be followed by block 308.

In block 308, encryption policy machine 122 looks up and returns an encryption policy for the socket from table 124 (FIG. 1) based on the identities of client application 108, user 232, or both in some examples of the present disclosure. Alternatively, in other examples of the present disclosure, encryption policy machine 122 pushes encryption policies as they become available to thin agent 110, which determines if the socket is to be encrypted from its local copy of table 124. An administrator may set encryption policies in table 124 for various combinations of client applications and users. Block 308 may be followed by block 310.

In block 310, when the socket is to be encrypted, thin agent 110 adds the socket's 5-tuple to list 209 (FIG. 2) of sockets to be encrypted or instructs socket filter to add the socket to list 219. Block 310 may be followed by block 312.

In block 312, protocol stack filter 209 (FIG. 2) detects an outbound packet protocol stack 204 (FIG. 2) for the socket in list 209 and tags it for encryption by hypervisor 104 on source host 102. Block 312 may be followed by block 314.

In block 314, hypervisor 104 on source host 102 detects the tagged outbound packet, uses encryption engine 211 (FIG. 2) to encrypt the outbound packet, and sends the encrypted outbound packet over tunnel 230 (FIG. 2) to hypervisor 114 on destination host 112.

Figure 4:
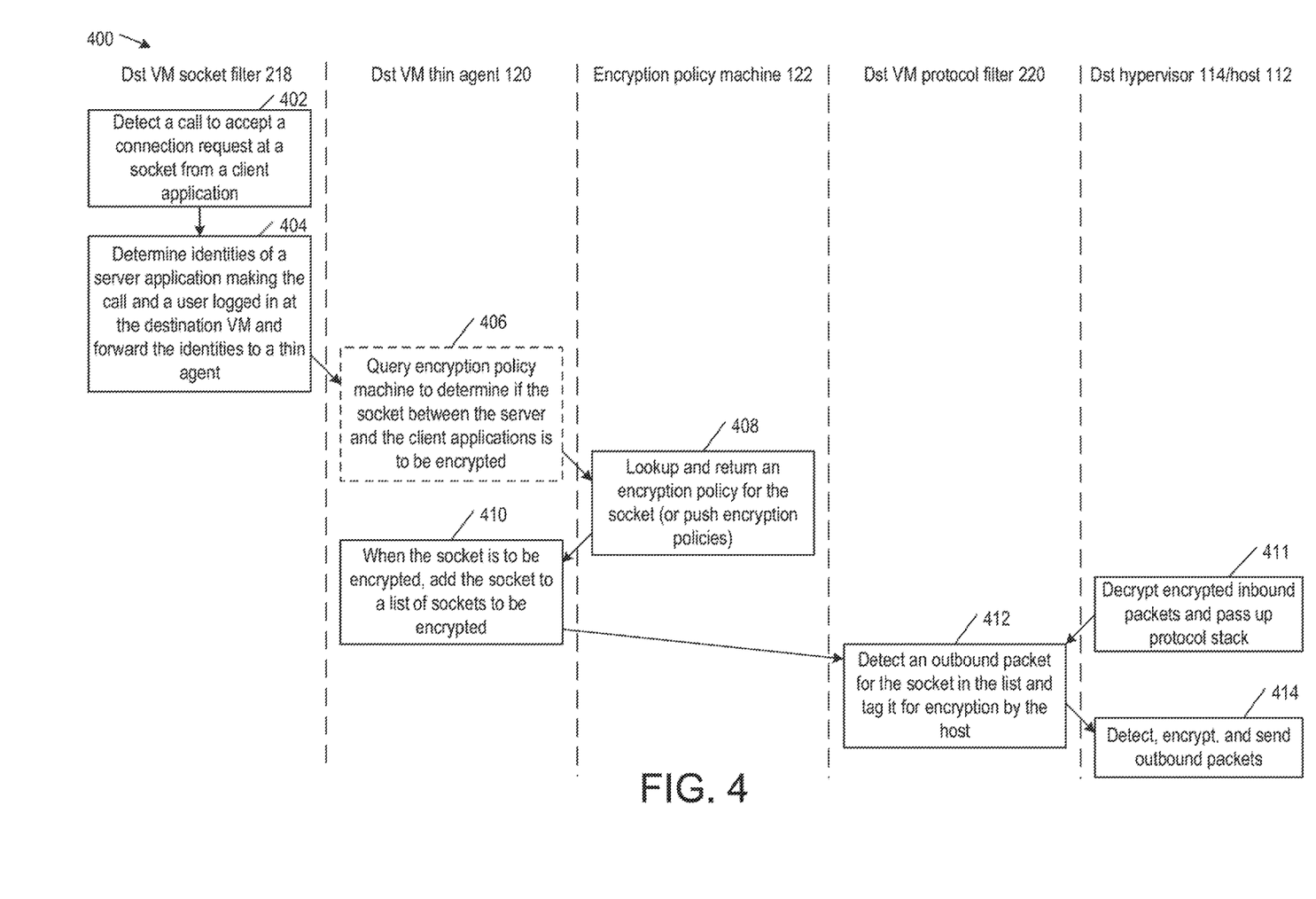
FIG. 4 is a block diagram illustrating a swim lane flowchart of a method for the server application in the destination VM to receive application data from the client application in the source VM and to send encrypted application data to the client application of FIG. 2 in some examples of the present disclosure.

FIG. 4 is a block diagram illustrating a swim lane flowchart of a method 400 for server application 118 in destination VM 116 on hypervisor 114 to receive application data from client application 108 in source VM 106 on hypervisor 104 and to send encrypted application data to client application 108 in some examples of the present disclosure.

Method 400 may begin in block 402. In block 402, socket filter 218 (FIG. 2) detects a call by server application 118 (FIG. 2) to socket API 212 (FIG. 2) to accept a connection request at a socket from client application 108 (FIG. 2). Block 402 may be followed by block 404.

In block 404, socket filter 218 determines the identities of server application 118 and a user 234 (FIG. 2) logged in on destination VM 116 and returns them to thin agent 120 (FIG. 2). Block 404 may be followed by optional block 406.

In optional block 406, thin agent 120 queries encryption policy machine 122 (FIG. 1) with the identities of client application 118, user 234, or both to determine if a socket between server application 118 and client application 108 is to be encrypted in some examples of the present disclosure. Optional block 406 may be followed by block 408.

In block 408, encryption policy machine 122 looks up and returns an encryption policy for the socket from table 124 (FIG. 1) based on the identities of client application 108, user 232, or both in some examples of the present disclosure. Alternatively, in other examples of the present disclosure, encryption policy machine 122 pushes encryption policies to thin agent 120, which determines if the socket is to be encrypted from its local copy of table 124. An administrator may set encryption policies in table 124 for various combinations of server applications and users. Block 408 may be followed by block 41.

In block 410, when the socket is to be encrypted, thin agent 120 adds the socket's 5-tuple to list 219 (FIG. 2) of sockets to be encrypted or instructs socket filter 218 to add the socket's 5-tuple to list 219. Block 410 may be followed by block 412.

In block 411, hypervisor 114 on destination host 112 decrypt an encrypted inbound packet received through tunnel 230 (FIG. 2) from hypervisor 104 on source host 102, and passes the inbound packet through vNIC driver 216 to protocol stack 214. This corresponds to block 314 in method 300 (FIG. 3). The inbound packet may be a request from client application 108 to server application 118. Block 411 may be followed by block 412.

In block 412, in protocol stack 214 (FIG. 2), protocol stack filter 220 (FIG. 2) detects an outbound packet for the socket in list 219 and tags it for encryption by hypervisor 114 on destination host 112. The outbound packet may be a response by server application 118 to a request from client application 108. Block 412 may be followed by block 414.

In block 414, hypervisor 114 on destination host 112 detects the tagged outbound packet, uses encryption engine 221 (FIG. 2) to encrypt the outbound packet, and sends the encrypted outbound packet over tunnel 230 (FIG. 2) to hypervisor 104 on source host 102.

Figure 5:
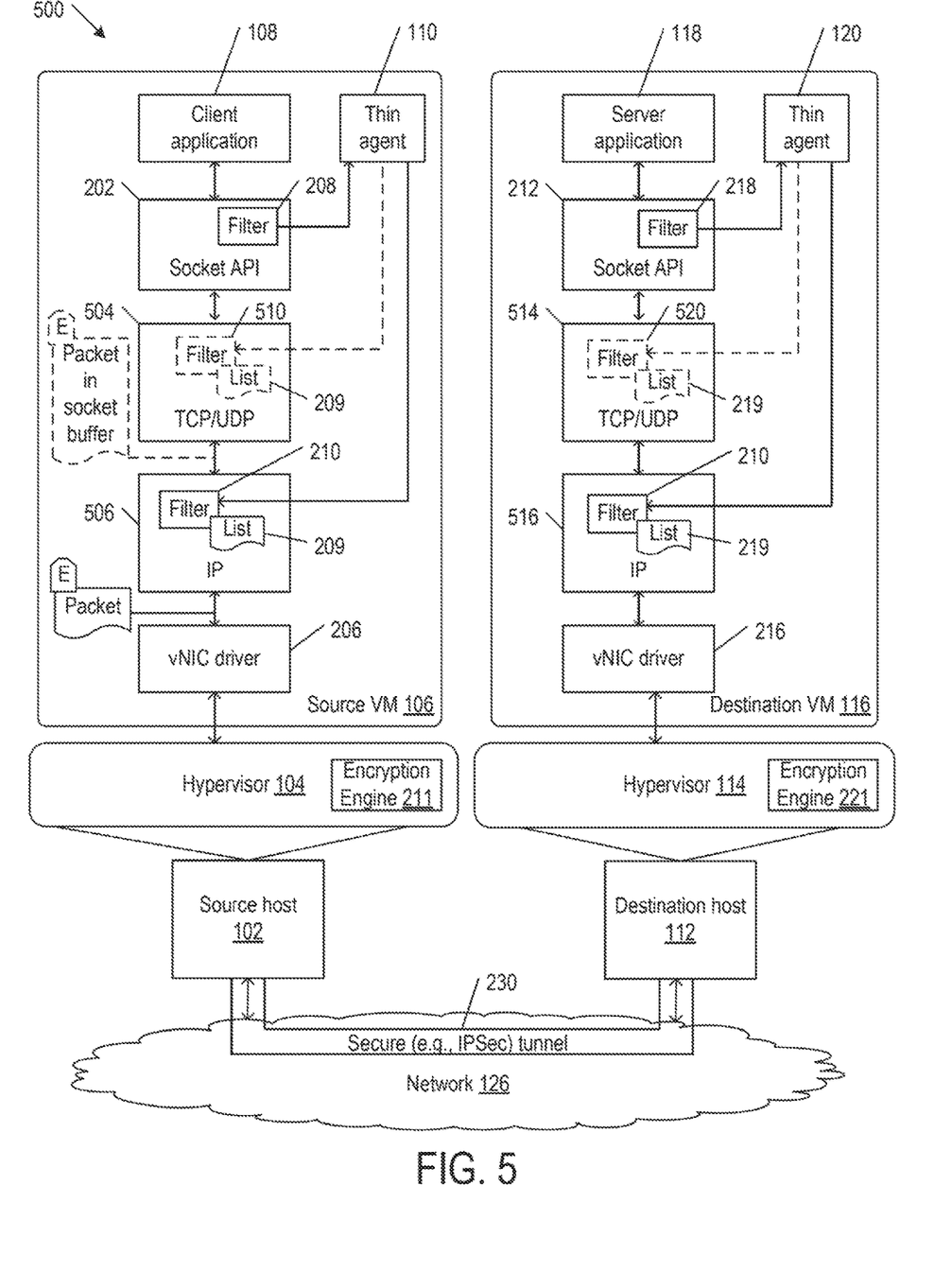
FIG. 5 is a block diagram illustrating different implementations of protocol stack filters of FIG. 2 in examples of the present disclosure.

FIG. 5 is a block diagram illustrating a VM system 500 with different implementations of protocol stack filters in examples of the present disclosure. VM system 500 is a variation of VM system 100 (FIG. 2). In one example, protocol stack 204 (FIG. 2) is shown as its components: a transport layer 504, such as a TCP or user datagram protocol (UDP) layer, and a network layer 506, such as an IP layer. When the guest OS in source VM 106 includes Windows Filtering Platform (WFP), socket filter 208 may be implemented with an ALE_AUTH_CONNECT layer callout in the application layer enforcement (ALE) layer, and protocol stack filter 210 may be an IP layer filter implemented with an OUTBOUND_IPPACKET layer callout. When IP layer filer 210 finds a matching packet with a 5-tuple in list 209 it adds a unique value to the options field in an IP (e.g., IPv4) header. In hypervisor 104 on source host 102, encryption engine 211 checks the options field and encrypts the packet if it contains the unique value. Encryption engine 211 also strips the options field after getting the unique value to revert the changes by IP layer filter 210.

In another example, protocol stack filter may be a transport layer filter 510 implemented with an OUTBOUND- _TRANSPORT layer callout. When transport layer filer 510 finds a matching packet with a 5-tuple in list 209, it tags a buffer for the packet (e.g., NET_BUFFER_LIST) with a unique value. When the packet buffer reaches vNIC driver 206, it passes the unique value and the packet to hypervisor 104 on source host 102. In hypervisor 104, encryption engine 211 encrypts the packet arriving with the unique value.

Protocol stack 214 (FIG. 2) is shown as its components a transport layer 514, such as a TCP or UDP layer, and a network layer 516, such as an IP layer. Socket filter 218 may be implemented with an ALE_AUTH_RECV_ACCEPT layer callout in the ALE layer, protocol stack filter 220 may be an IP layer filter implemented with an OUTBOUND_IP-PACKET layer callout or a transport layer filter 520 implemented with an OUTBOUND_TRANSPORT layer callout, and they may operate similarly as their counterparts to send data from server application 118 to client application 108.

Figure 6:
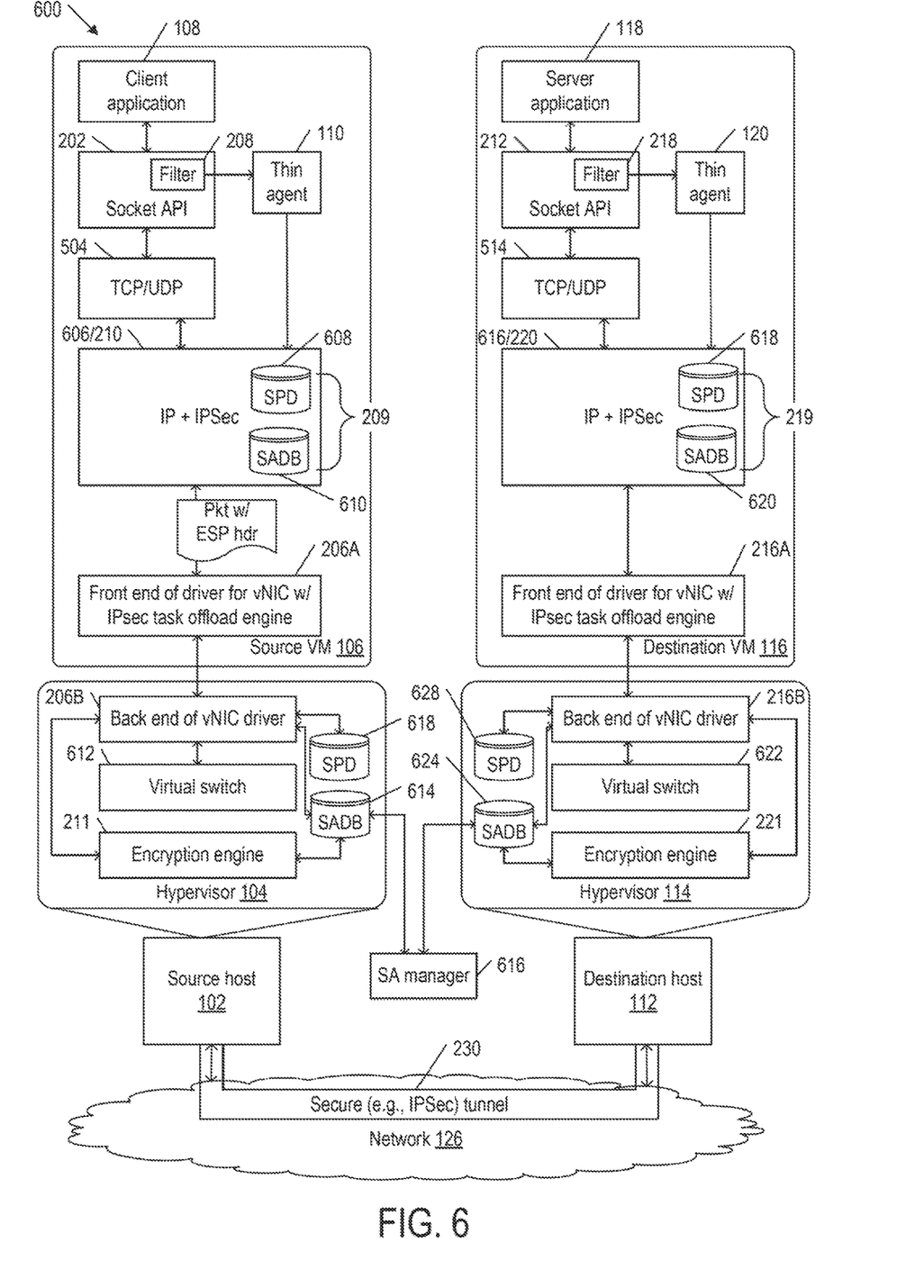
FIG. 6 is a block diagram illustrating a different implementation of protocol stack filter of FIG. 2 in examples of the present disclosure.

FIG. 6 is a block diagram illustrating a VM system 600 with a different of protocol stack filter in examples of the present disclosure. VM system 600 is a variation of system 100 (FIG. 2). In one example, protocol stack 204 (FIG. 2) is shown as its components: a transport layer 504, such as a TCP or UDP layer, and a network layer 606, such as an IP layer and an IPSec stack implemented as part of the IP layer. When the guest OS in source VM 106 includes WFP, socket filter 208 may be implemented with an ALE_AUTH_CONNECT layer callout in the ALE layer. Protocol stack filter 210 may be the IPSec stack in IP layer 606. List 209 may be implemented with a security policy database (SPD) 608 and a security association database (SADB) 610. vNIC driver 206 may be a driver for a vNIC with IPSec task offload engine. vNIC driver 206 may be a para-virtualized driver with a front end 206A implemented in source VM 106 and a back end 206B implemented in hypervisor 104 on source host 102. The IPSec task offload engine may be implemented by encryption engine 211 in hypervisor 104.

When thin agent 110 determines a socket is to be encrypted, it manually sets dummy outbound and inbound SAs for the socket in SADB 610 and the 5-tuple of the socket as a dummy policy entry in SPD 608 that leads to the dummy outbound SA in SADB 610. Each dummy SA includes the source IP address of the socket, the destination IP address of the socket, a dummy SPI that identifies the dummy SA in SADB 610, and dummy ESP information (e.g., a dummy encryption algorithm and a dummy encryption key). IPSec stack 210 passes the SA information to vNIC driver 206.

When back end 206 of the vNIC driver detects the dummy SPI in the SA information, it uses the destination IP address of the socket in the SA information to look up the IP address of the destination host with the destination VM. Back end 206 may find the destination host with the destination VM in a forwarding table of a virtual switch 612, which implements a virtual network that connects VMs that may be located on different hosts.

Back end 206B of the vNIC driver then determines the SPI of the outbound SA for the destination host from a SADB 614 that stores outbound and inbound SAs for the hosts in system 500. The outbound and the inbound SAs in SADB 612 may be centrally provisioned by a SA manager 616 to all the hypervisors in system 500. Back end 206B of the vNIC driver adds a policy entry with the destination and the source IP addresses of the socket and the SPI of the outbound SA for the destination host in a SPD 618.

When IPSec stack 210 finds an outbound packet flowing from transport layer 504 to network layer 606 that matches the dummy policy entry in SPD 608, it constructs an IPSec (ESP) header based on the dummy outbound SA and passes the ESP header and the packet to vNIC driver 206 for ESP encryption. The ESP header includes the dummy SPI of the dummy outbound SA. Back end 206B of the vNIC driver checks the source and the destination IP addresses of the outbound packet. If the source and the destination IP addresses matches the policy entry in SPD 618, back end 206B of the vNIC driver replaces the dummy SPI with the SPI in the policy entry and then send the outbound packet to encryption engine 221. Using the SPI in the ESP header, encryption engine 211 encrypts the outbound packet based on the outbound SA for the destination host in SADB 614.

When the encrypted outbound packet arrives at, hypervisor 114 on destination host 112, encryption engine 221 parses the SPI from the ESP header and uses it to retrieve an inbound SA from a SADB 620. Encryption engine 221 then decrypts the packet based on the inbound SA and passes the inbound packet through vNIC driver 216 to protocol stack 214.

Protocol stack 214 (FIG. 2) is shown as its components a transport layer 514, such as a TCP or UDP layer, and a network layer 616, such as an IP layer and an IPSec stack implemented as part of the IP layer. Socket filter 218 may be implemented with an ALE_AUTH_RECV_ACCEPT layer callout in the ALE layer, protocol stack filter 220 may be the IPSec stack in IP layer 616, list 219 may be implemented with a SPD 618 and a SADB 620, vNIC driver 216 may be a driver for a vNIC with IPSec task offload engine. vNIC driver 216 may be a para-virtualized driver with a front end 216A implemented in destination VM 116 and a back end 216B implemented in hypervisor 114 on destination host 112. The IPSec task offload engine may be implemented by encryption engine 221 in hypervisor 114. Hypervisor further includes a virtual switch 622, a SADB 624, and a SPD 628. These components may operate similarly as their counterparts to send data from server application 118 to client application 108.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM) magnetic disk or optical storage media, flash memory devices, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for selective encryption, the method comprising:
   filtering calls, at a virtual machine on a host, to connect sockets to server applications;
   when a call, by a client application of a plurality of client applications on the virtual machine, to connect a socket to a server application is detected, determining if the socket, which is between the client application and the server application, is to be encrypted,
   wherein said determining if the socket is to be encrypted includes querying an encryption policy machine for encryption policies that selectively specify encryption or non-encryption of traffic from each of the plurality of client applications on the virtual machine, and wherein the encryption policies selectively specify the encryption or the non-encryption based on at least one of identities of: the client applications or the user logged in on the virtual machine;
   when the socket is to be encrypted and an outbound packet for the socket is detected, tagging the outbound packet for encryption by a hypervisor on the host; and
   sending the outbound packet to a virtual network interface card (VNIC) emulated by the hypervisor, wherein when the hypervisor detects the tag for the outbound packet, the hypervisor causes the outbound packet to be encrypted, and sends the encrypted outbound packet to the server application.

2. The method of claim 1, further comprising, when the call is detected, determining the identities of the client application and the user.

3. The method of claim 2, wherein said filtering calls and said determining the identities of the client application and the user comprise using a socket filter.

4. The method of claim 1, wherein said determining if the socket, which is between the client application and the server application, is to be encrypted comprises finding an encryption policy based on the identities of the client application and the user.

5. The method of claim 4, wherein said finding the encryption policy comprises finding the encryption policy among encryption polices pushed from the encryption policy machine.

6. The method of claim 1, further comprising:
   when the socket is to be encrypted, adding the socket to a list of sockets to encrypt; and
   filtering outbound packets in a protocol stack of the virtual machine, wherein said filtering outbound packets in the protocol stack of the virtual machine comprises filtering the outbound packets for sockets in the list of sockets to encrypt.

7. The method of claim 6, wherein said adding the socket to the list of sockets to encrypt comprises adding an entry comprising the socket's protocol, source address, source port, destination port, and destination address to the list.

8. The method of claim 6, wherein said adding the socket to the list of sockets to encrypt comprises adding the socket to a security policy database (SPD) and adding a security association (SA) for the socket in a security association database (SADB).

9. The method of claim 1, wherein said tagging the outbound packet for encryption comprises adding an encryption tag to a field in a header of the outbound packet.

10. The method of claim 9, further comprising filtering outbound packets in a protocol stack of the virtual machine, wherein said filtering outbound packets and said adding the encryption tag comprises using a network layer filter.

11. The method of claim 1, wherein said tagging the outbound packet for encryption comprises adding an encryption tag to a socket buffer for the outbound packet.

12. The method of claim 11, further comprising filtering outbound packets in a protocol stack of the virtual machine, wherein said filtering outbound packets and said adding the encryption tag to the socket buffer for the outbound packet comprises using a transport layer filter.

13. The method of claim 1, wherein said tagging the outbound packet for encryption comprises providing an Internet Protocol Security (IPSec) header with the outbound packet to a VNIC with an IPSec task offload engine implemented by the hypervisor.

14. The method of claim 1, wherein the hypervisor uses IPSec to encrypt the outbound packet and send the encrypted outbound packet to the server application.

15. A non-transitory computer-readable storage medium encoded with instructions executable by a processor to selectively encrypt packets, the instructions comprising:
   filtering calls, at a virtual machine on a host, to connect sockets to server applications;
   when a call, by a client application of a plurality of client applications on the virtual machine, to connect a socket to a server application is detected, determining if the socket, which is between the client application and the server application, is to be encrypted,
   wherein said determining if the socket is to be encrypted includes querying an encryption policy machine for encryption policies that selectively specify encryption or non-encryption of traffic from each of the plurality of client applications on the virtual machine, and wherein the encryption policies selectively specify the encryption or the non-encryption based on at least one of identities of: the client applications or the user logged in on the virtual machine;
   when the socket is to be encrypted and an outbound packet for the socket is detected, tagging the outbound packet for encryption by a hypervisor on the host; and
   sending the outbound packet to a virtual network interface card (VNIC) emulated by the hypervisor, wherein when the hypervisor detects the tag for the outbound packet, the hypervisor causes the outbound packet to be encrypted, and sends the encrypted outbound packet to the server application.

16. The storage medium of claim 15, wherein said tagging the outbound packet for encryption comprises adding an encryption tag to a field in a header of the outbound packet or adding an encryption tag a socket buffer for the outbound packet.

17. The storage medium of claim 15, wherein said tagging the outbound packet for encryption comprises providing an IPSec header with the outbound packet to a VNIC with an IPSec task offload engine implemented by the hypervisor.

18. A host, comprising:
- a processor; and
- a non-transitory computer-readable storage medium encoded with instructions for a hypervisor executable by the processor;
- the hypervisor; and
- a virtual machine run by the hypervisor, wherein the virtual machine comprises:
  - a socket filter configured to filter calls to connect sockets to server applications;
  - a thin agent configured to, when the socket filter detects a call, from a client application of a plurality of client applications on the virtual machine, to connect a socket to a server application, determine if the socket, which is between the client application and the server application, is to be encrypted,
  - wherein determination if the socket is to be encrypted includes query of an encryption policy machine for encryption policies that selectively specify encryption or non-encryption of traffic from each of the plurality of client applications on the virtual machine, and wherein the encryption policies selectively specify the encryption or the non-encryption based on at least one of: identities of: the client applications or the user logged in on the virtual machine; and
  - a protocol layer filter configured to:
    - when the socket is to be encrypted and an outbound packet for the socket is detected, tag the outbound packet for encryption by the hypervisor,
  - wherein when the hypervisor detects the tag for the outbound packet, the hypervisor causes the outbound packet to be encrypted, and sends the encrypted outbound packet to the server application.

19. The host of claim 18, wherein the protocol layer filter is configured to add an encryption tag to a field in a header of the outbound packet or add an encryption tag a socket buffer for the outbound packet.

20. The host of claim 18, wherein the virtual machine further comprises:
- an Internet Protocol (IP) layer with IPSec; and
- a driver for a virtual network interface card (VNIC) with an IPSec task offload engine implemented by the hypervisor, and
- wherein the protocol layer filter is configured to tag the outbound packet for encryption by providing an IPSec header with the outbound packet to the driver.

21. A method for selective encryption, the method comprising:
- when a call, by a client application of a plurality of client applications on a virtual machine that runs on a host, to connect a socket to a server application is detected, determining if the socket, which is between the client application and the server application, is to be encrypted, wherein encryption policies selectively specify encryption or non-encryption of traffic for combinations of identities of each of the plurality of client applications and respective users;
- when the socket is to be encrypted and an outbound packet, from the client application, for the socket is detected, tagging the outbound packet for encryption by a hypervisor on the host; and
- causing, by the hypervisor, the tagged outbound packet to be encrypted, wherein untagged outbound packets, corresponding to combinations of at least some of the other client applications on the virtual machine and respective users of the at least some of the other client applications, are unencrypted by the hypervisor.

* * * * *